United States Patent [19]

Hanada

[11] Patent Number: 5,535,855
[45] Date of Patent: Jul. 16, 1996

[54] BICYCLE HUB BRAKE

[75] Inventor: Mitsugu Hanada, Sakai, Japan

[73] Assignee: Shimano, Inc., Osaka, Japan

[21] Appl. No.: 456,641

[22] Filed: Jun. 2, 1995

[30] Foreign Application Priority Data

Jun. 23, 1994 [JP] Japan ................................ 6-141314

[51] Int. Cl.$^6$ ................................ G05G 7/00; B62L 3/02; F16H 59/04
[52] U.S. Cl. .................... 188/24.14; 188/26; 74/388 R
[58] Field of Search ............................ 188/24.14, 24.22, 188/26, 71.5, 134; 74/388 R; 192/12 R, 17

[56] References Cited

U.S. PATENT DOCUMENTS

| | | | |
|---|---|---|---|
| 4,182,194 | 1/1980 | Tomozawa | 188/26 |
| 4,515,256 | 5/1985 | Kitano et al. | 192/12 R |
| 4,597,477 | 7/1986 | Miller | 188/134 |
| 5,201,236 | 4/1993 | Nagano | 188/24.14 |
| 5,421,435 | 6/1995 | Hanada | 188/24.14 |

FOREIGN PATENT DOCUMENTS 2-35897  3/1990  Japan .

*Primary Examiner*—Robert J. Oberleitner
*Assistant Examiner*—Chris Schwartz
*Attorney, Agent, or Firm*—James A. Deland

[57] ABSTRACT

A bicycle hub brake wherein a rotating member rotates with a bicycle wheel, and a brake actuating mechanism causes a brake member to apply a braking force to a braking surface. An intermediate member is disposed between the brake actuating mechanism and the rotating member for moving relative to one of the brake actuating mechanism and the rotating member when a braking force less than a selected value is applied to the braking surface and for moving relative to the other one of the brake actuating mechanism and rotating member when a braking force greater than the selected value is applied to the braking surface.

15 Claims, 11 Drawing Sheets

BICYCLE HUB BRAKE

BACKGROUND OF THE INVENTION

The present invention is directed to braking devices for bicycles and, more particularly, to a bicycle hub brake which includes a mechanism for preventing overbraking.

A known bicycle hub brake is disclosed in Japanese Utility Model 2-35897. This bicycle hub brake includes a brake frame that supports a pair of brake shoes and a brake operation component. The brake shoes are disposed radially within a brake drum which rotates together with the bicycle wheel. In operation, the brake operation component pivots when a brake wire is pulled, and a cam surface on the brake operation component causes the brake shoes to move radially outwardly and press against the brake drum. The brake frame is connected to a support member through a spring so that, when a prescribed braking force is reached, the frictional contact between the brake shoe and the rotating brake drum causes the brake frame and brake shoes to move in the direction of the rotating drum against the force of the spring. This movement causes the brake operation device to move toward the brake wire housing which, in turn, creates slack in the brake wire to automatically reduce the frictional force between the brake shoe and the brake drum.

Figure 13:
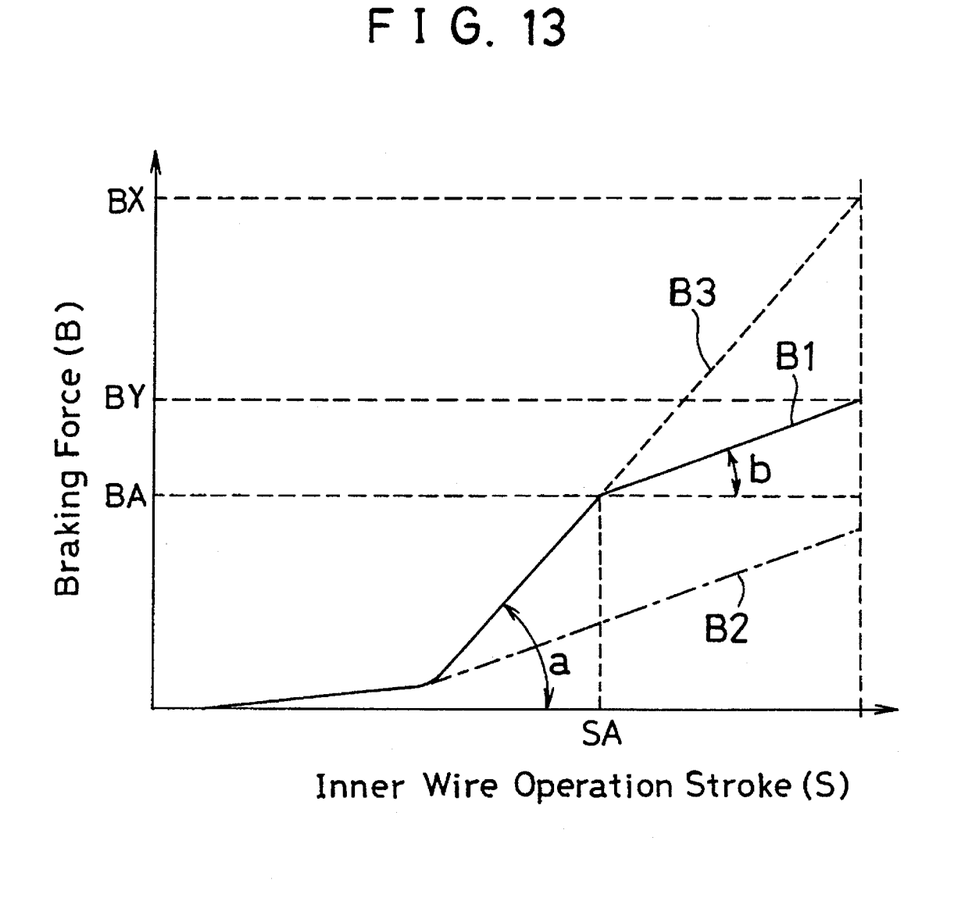
FIG. 13 is a graph showing brake force as a function of the brake wire operating stroke for a known bicycle hub brake which compensates for overbraking.

Operation of the prior art hub brake is shown graphically in FIG. 13. The inner wire operating stroke S is assigned to the horizontal axis, and the braking force B is assigned to the vertical axis. Until the brake wire operation stroke reaches a predetermined stroke SA, the braking force increases at a first angle of slope "a." After the operating stroke reaches the predetermined stroke SA and the braking force reaches the predetermined braking force BA determined by the spring, slackening of the brake wire causes the braking force to increase at a second angle of slope "b," where the slope "b" is smaller than the slope "a."

Some hub brakes use grease to control the frictional force between the brake shoe and the brake drum. When the grease is depleted, the frictional braking force increases excessively, and overbraking occurs. Even in brakes which are intended to operate without grease, rusting and dust penetration cause the frictional braking force to increase excessively, and overbraking again occurs. Fortunately, the known brake prevents such overbraking to a limited extent. For example, as indicated in FIG. 13, under normal conditions in which grease depletion or rusting has not occurred, the braking force is indicated by braking force line B2. When abnormal conditions prevail, the braking force is indicated by braking force line B1. The maximum braking force BX occurs in conventional hub brakes which do not have the compensation mechanism described above. In those hub brakes the variation of the braking force is shown by braking force line B3. Thus, the maximum braking force created under abnormal conditions in a hub brake of the type described above is braking force BY, located at the top of braking force line B1, and this maximum braking force BY is lower than the maximum braking force BX which occurs in conventional hub brakes.

Unfortunately, a hub brake which employs the compensation mechanism described above tends to be relatively large, since the brake frame must be constructed to allow some movement, and some accommodation must be made to couple a free end of the brake frame to a spring. Thus, a more compact hub brake which prevents overbraking is desirable.

SUMMARY OF THE INVENTION

The present invention is directed to a relatively compact hub brake which prevents overbraking. In one embodiment of the present invention, a rotating member rotates with a bicycle wheel, and a brake actuating mechanism causes a brake member to apply a braking force to a braking surface. An intermediate member is disposed between the brake actuating mechanism and the rotating member for moving relative to one of the brake actuating mechanism and the rotating member when a braking force less than a selected value is applied to the braking surface and for moving relative to the other one of the brake actuating mechanism and rotating member when a braking force greater than the selected value is applied to the braking surface. More specifically, in a particular embodiment the intermediate member is disposed between the brake member and the rotating member, and the braking surface is disposed on the intermediate member. The intermediate member includes a surface which frictionally engages a surface of the rotating member, and the brake member includes a surface which frictionally engages the braking surface. A coefficient of friction or force of frictional contact between the surface of the intermediate member and the surface of the rotating member is ordinarily greater than a coefficient of friction or force of frictional contact between the surface of the brake member and the braking surface. Thus, the intermediate member moves integrally with the rotating member and relative to the brake member when a braking force less than the selected value is applied to the braking surface, and the intermediate member is substantially fixed to the brake member and moves relative to the rotating member when a braking force greater than the selected value is applied to the braking surface. Although braking force increases when the intermediate member moves integrally with the rotating member, the braking force is still less than would occur if braking force was determined solely by the friction between the brake shoe and the intermediate member. If desired, a warning device may be coupled to the brake drum for providing a signal indicating when the brake drum moves relative to the intermediate member.

In another embodiment of the present invention, the rotating member comprises a wheel hub, and the intermediate member comprises a brake drum having an inner peripheral surface comprising the braking surface. A torque limiter is disposed between the brake drum and the hub so that the brake drum rotates relative to the hub when a braking force greater than the selected value is applied to the braking surface. In this embodiment, the torque limiter comprises a first friction member coupled to one of the brake drum or the hub and a second friction member coupled to the other one of the brake drum or the hub. The first friction member has a first friction surface which frictionally engages a second friction surface of the second friction member, and a spring biases the first friction surface and the second friction surface toward each other. The first and second friction members thus act as a clutch for allowing the brake drum to rotate relative to the hub when a braking force greater than the selected value is applied to the braking surface

DETAILED DESCRIPTION OF THE EMBODIMENTS

Figure 1:
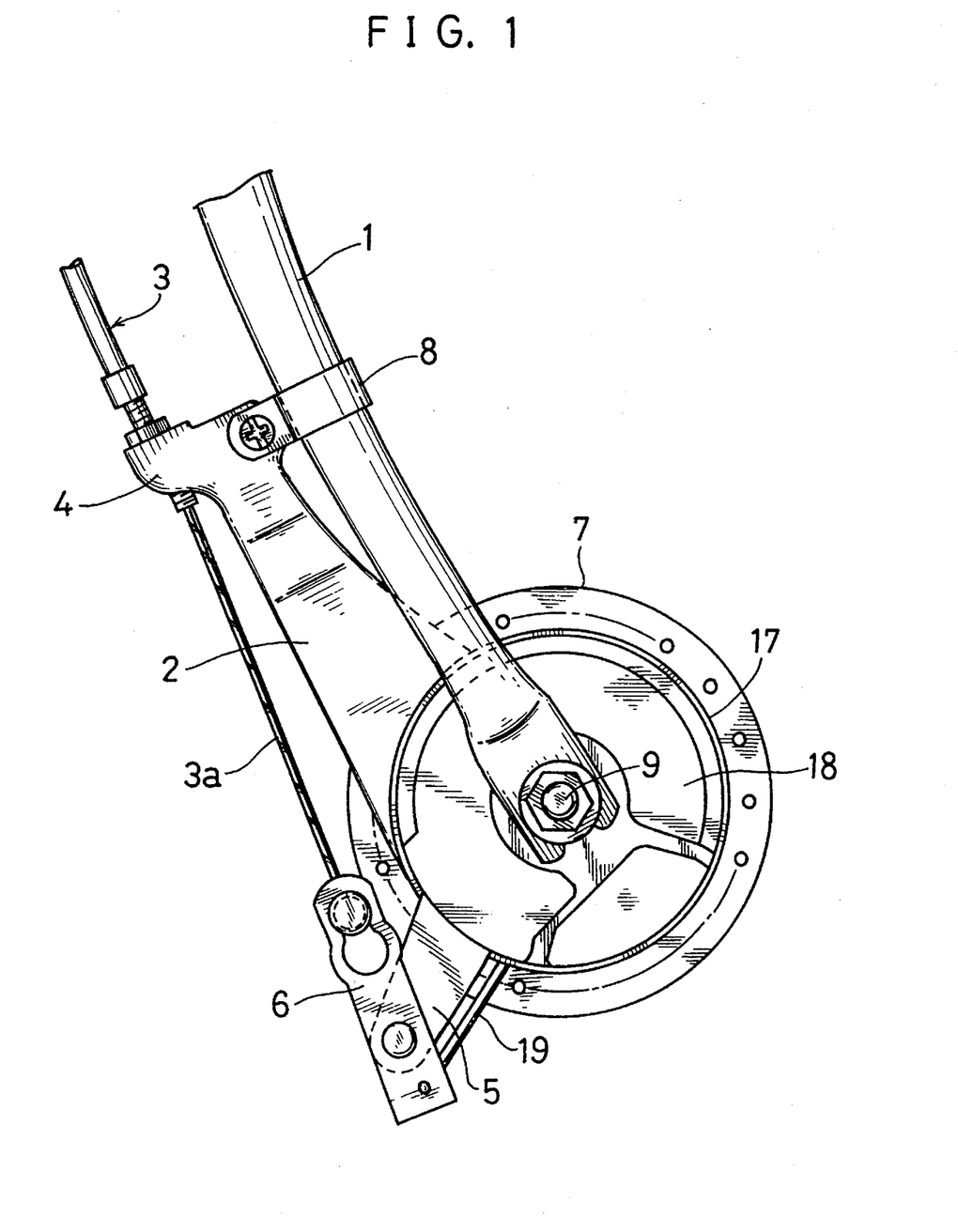
FIG. 1 is a side view of a particular embodiment of a bicycle hub brake according to the present invention.
Figure 2:
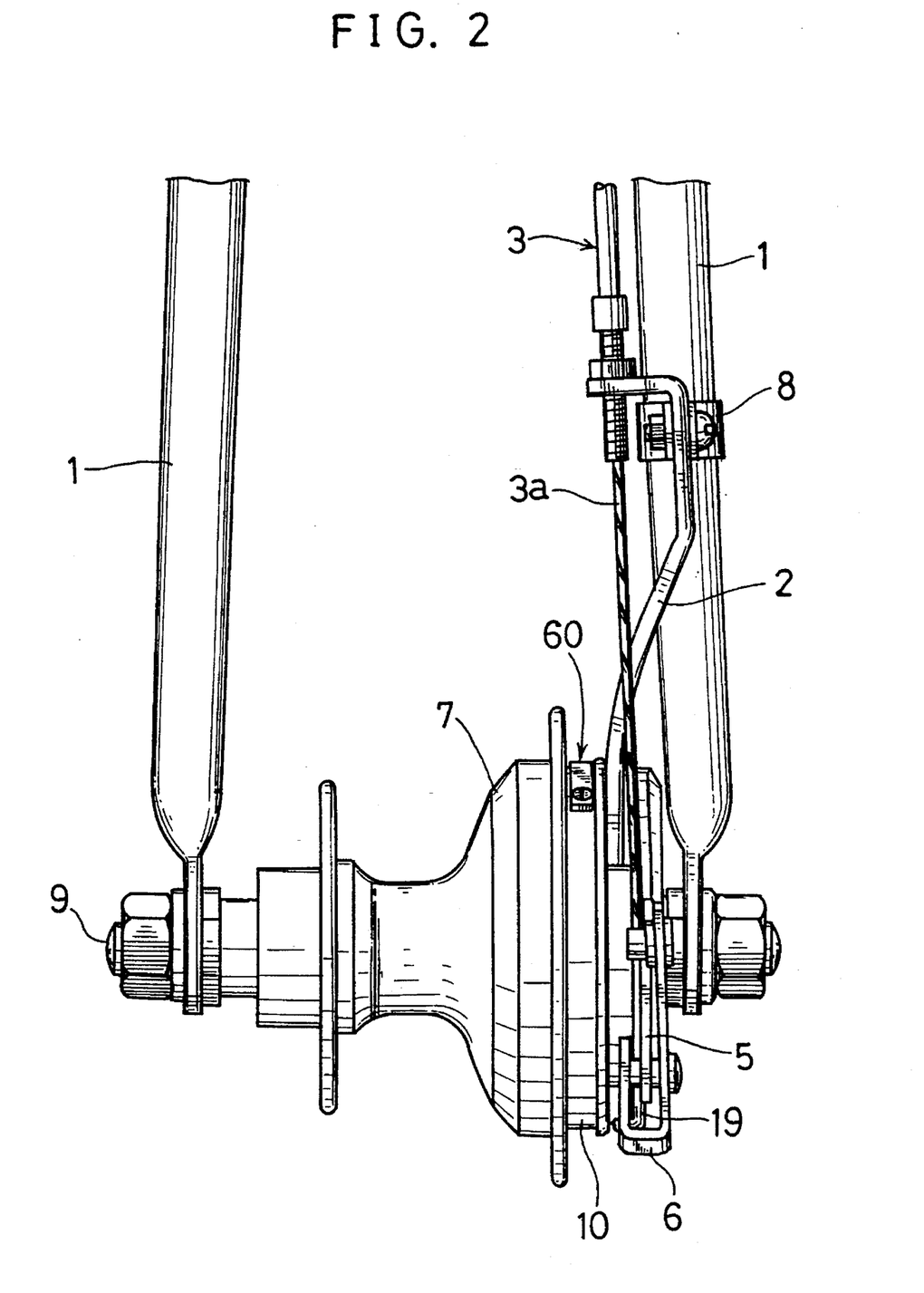
FIG. 2 is a front view of the bicycle hub brake shown in FIG. 1.

One embodiment of a bicycle hub brake according to the present invention is constructed as illustrated in FIGS. 1 and 2. A fixed component 2 is fixed to the bicycle front wheel fork 1 so that it does not move even when subjected to braking reaction force. The outer wire of a brake wire 3 is mounted in an outer holder 4 provided to the fixed component 2. An inner wire 3a is linked to a wire coupler 6 provided to a brake operation component 5 so that when the inner wire 3a is pulled or released, the brake operation component 5 slides so that the front wheel hub 7 is braked and the front wheel is in turn braked, or so that the brake is released from the front wheel hub 7 so that the brake is released from the front wheel.

Figure 4:
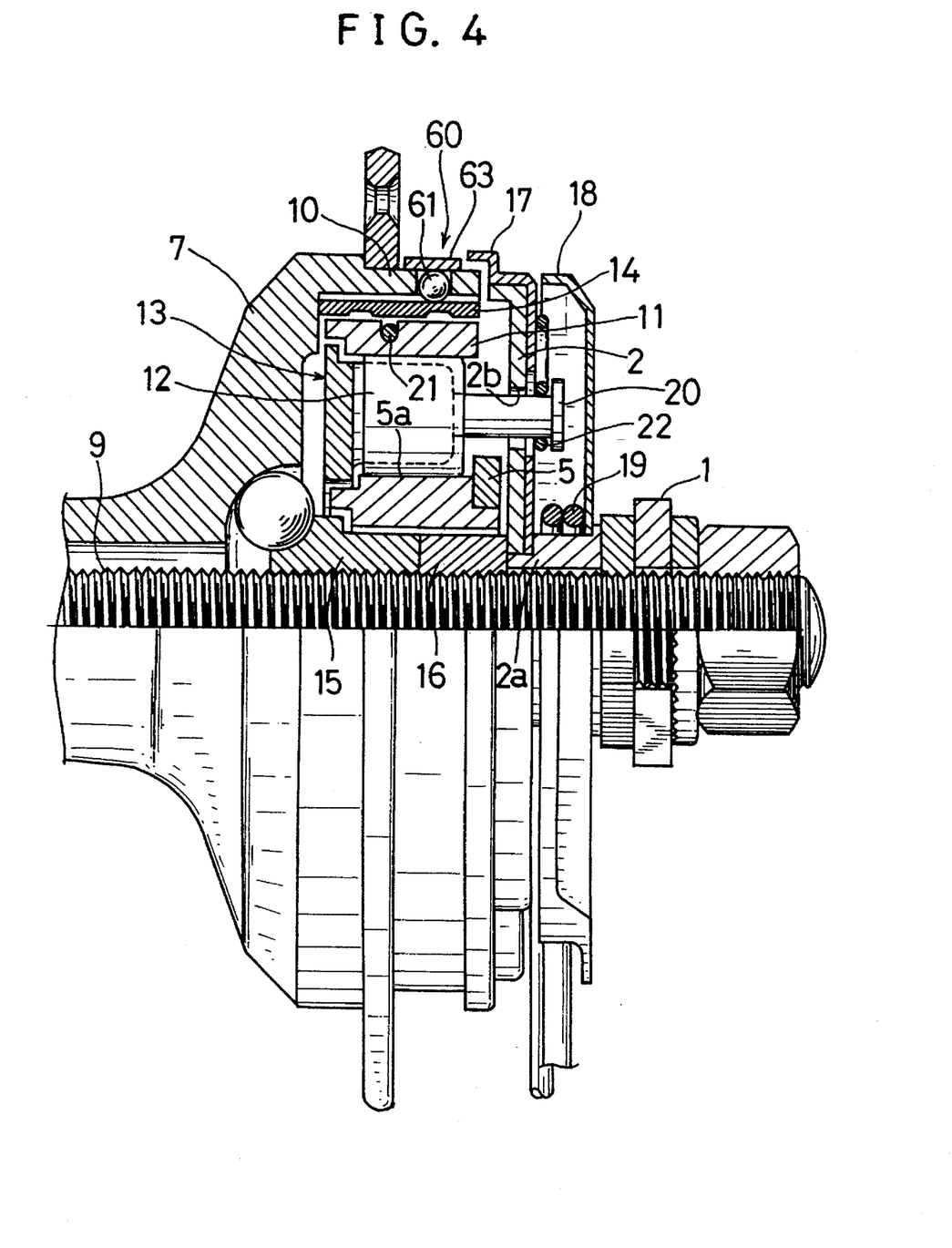
FIG. 4 is a rear partial cross-sectional view of the bicycle hub brake shown in FIG. 1.

The fixed component 2 is constructed so as to be fixed to the front wheel fork 1 by a clamping band 8 at one end, as shown in FIG. 1 and FIG. 2, and by a mounting boss component 2a at the other, as shown in FIG. 4. Specifically, it is constructed so that the mounting boss component 2a fits around the hub spindle 9 and so that the other end of the fixed component 2 is supported by the front wheel fork 1 via the hub spindle 9. The clamping band 8 is mounted on the front wheel fork 1, and the fixed component 2 is attached to the front wheel fork 1 so that it does not rotate around the axis of the hub spindle 9. Thus, the mounting boss component 2a is attached to the hub spindle 9 and the clamping band 8 is attached to the front wheel fork 1 so that the fixed component 2 is fixed to the front wheel fork 1 so as not to move even when subjected to braking reaction force. As illustrated in FIG. 4, one end of the front wheel hub 7 is provided with an integrally formed brake drum 10 so that the brake drum 10 and the front wheel hub 7 rotate as an integrated unit.

Figure 5:
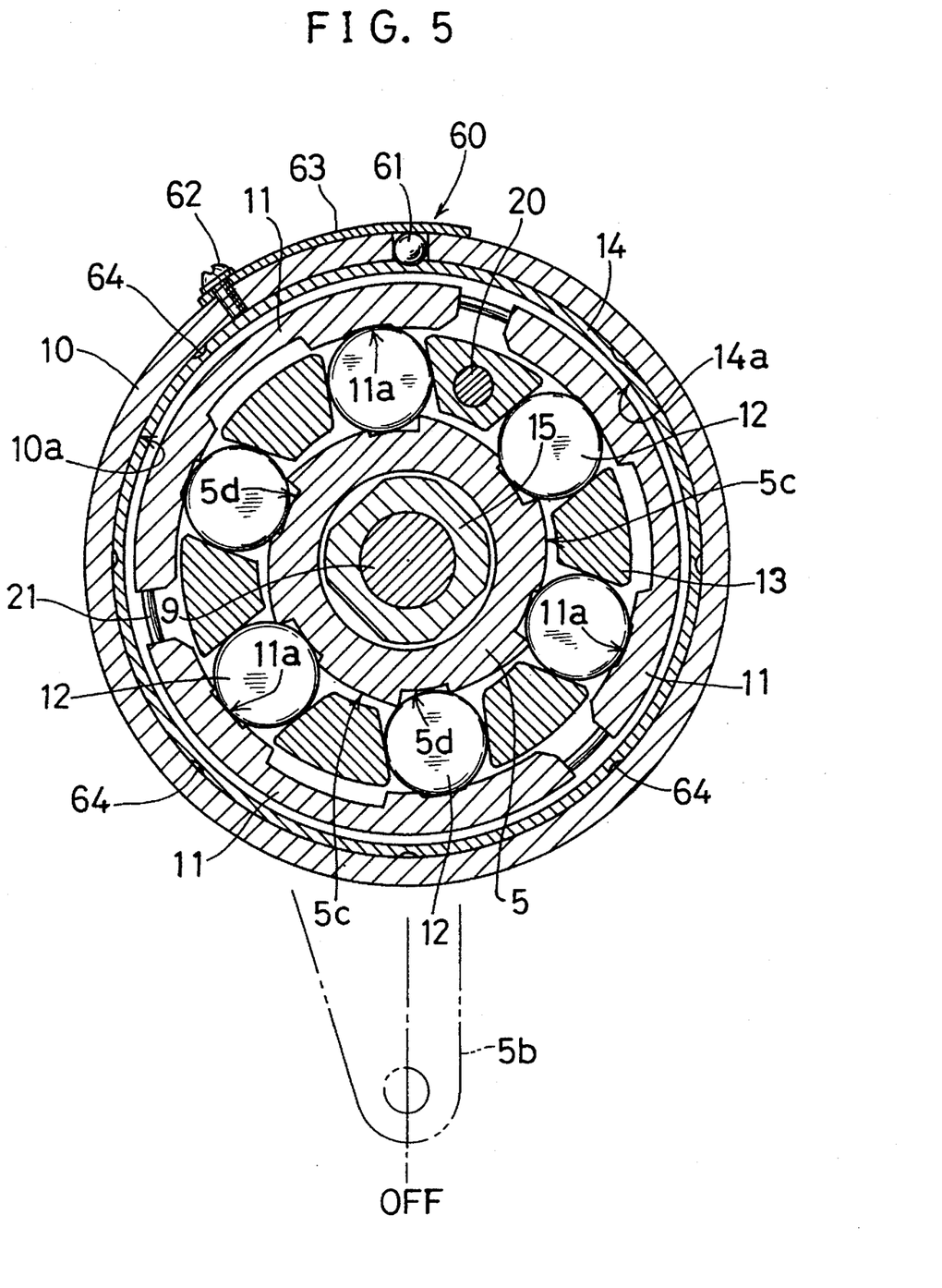
FIG. 5 is a side cross-sectional view of the bicycle hub brake shown in FIG. 1 in the OFF position.

As illustrated in FIGS. 4 and 5, the space between the inside perimeter surface 10a of the brake drum 10 and the operating cam component 5a of the aforementioned brake operation component 5 is provided with a plurality of brake shoes 11 that are distributed along the perimeter of the brake drum 10, a plurality of rollers 12 that are distributed along the perimeter of the brake drum 10, such that two are located at the inside perimeter surface side of each brake shoe 11, a roller case 13 which serves to maintain the intervals between the positioned rollers 12 at a prescribed interval and to retain the rollers 12 so that locational shift along the brake drum perimeter is prevented, and a ring-shaped sliding member 14 located on the outside perimeter surface side of the of brake shoes 11.

Figure 3:
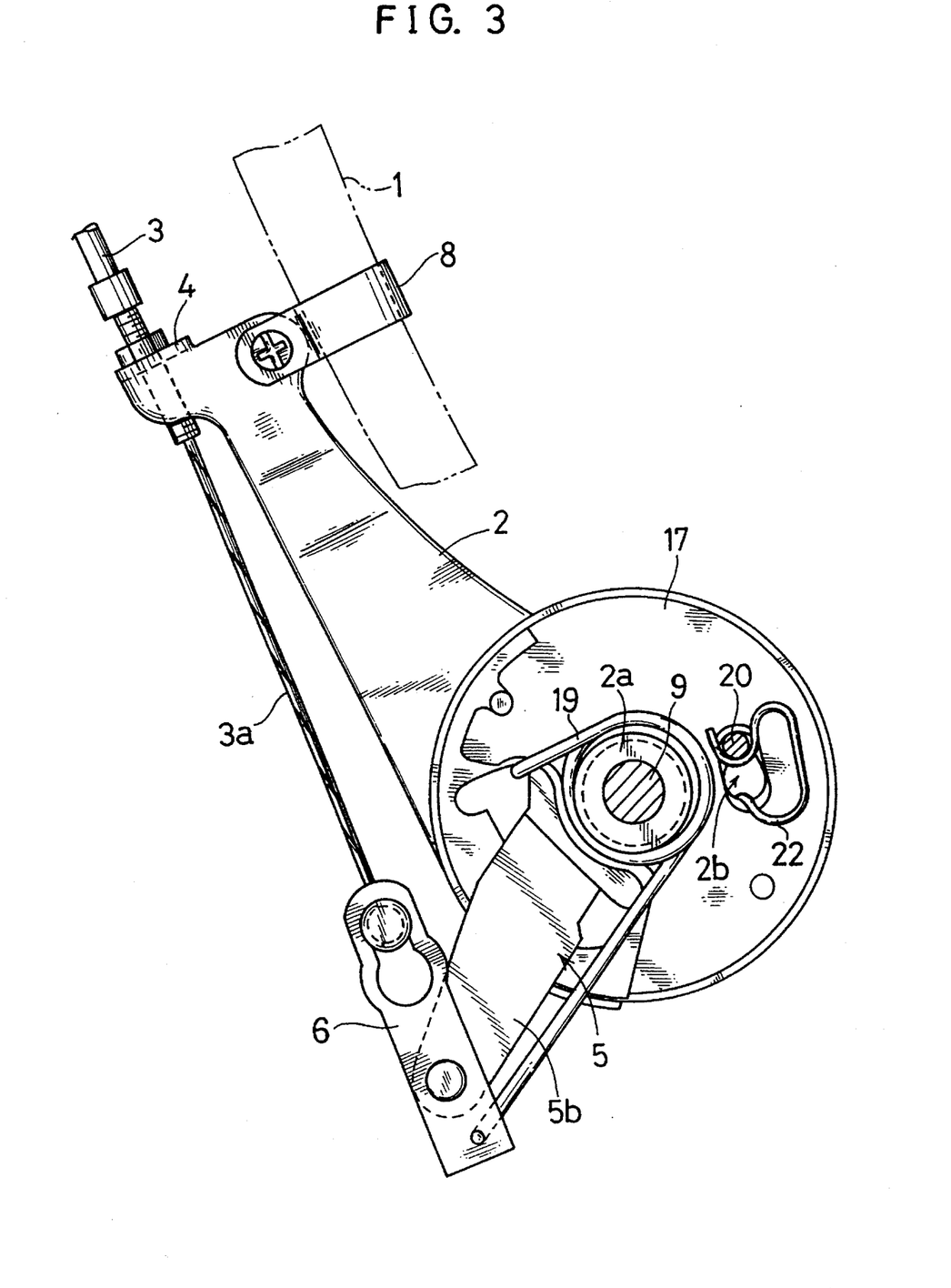
FIG. 3 is side view of the bicycle hub brake shown in FIG. 1 with the decorative cap removed.
Figure 6:
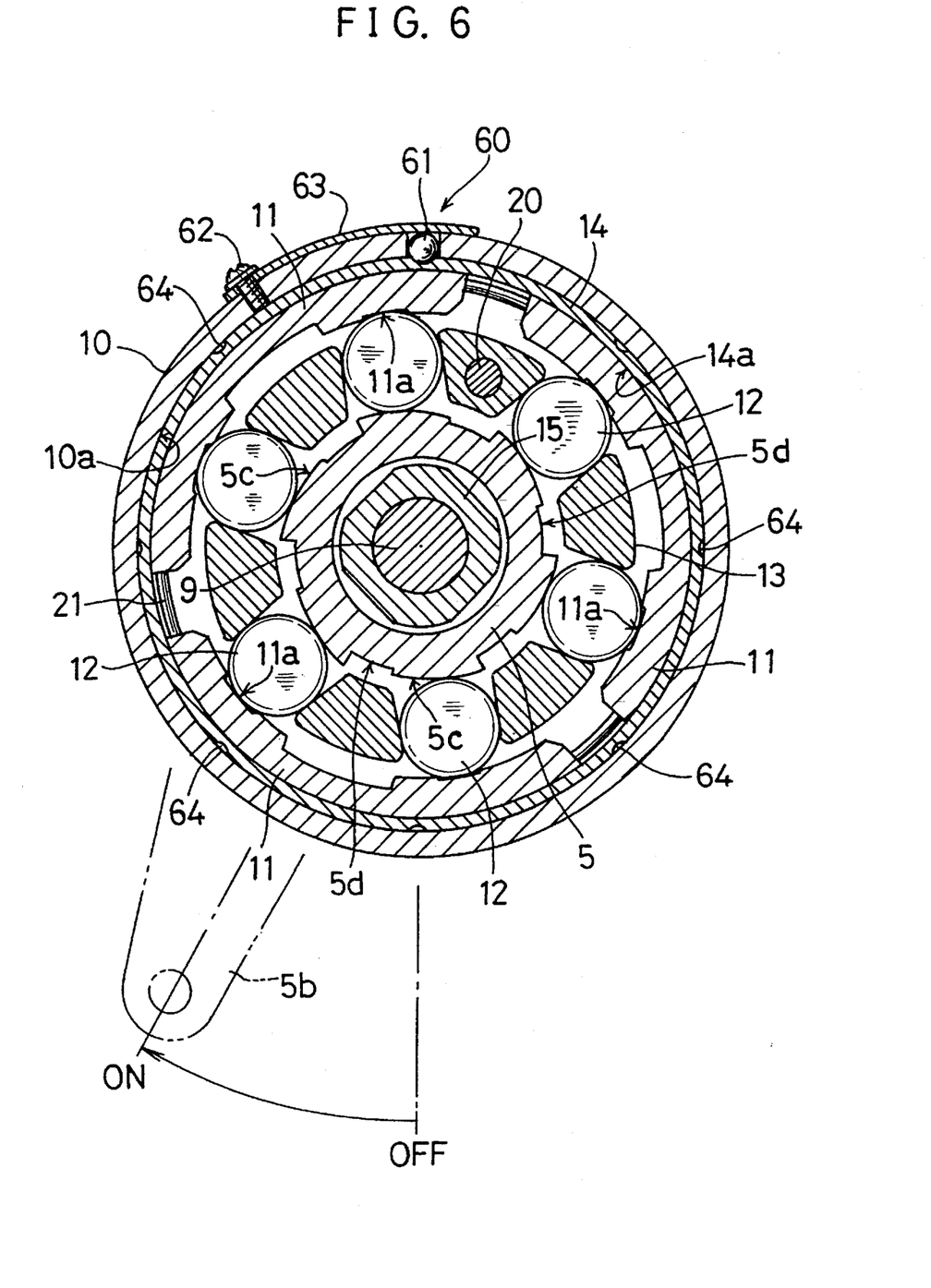
FIG. 6 is a side cross-sectional view of the bicycle hub brake shown in FIG. 1 in the ON position.

The brake operation component 5, as indicated in FIGS. 4 and 5, comprises the aforementioned operating cam component 5a (which fits around a cone 15 and a cone fixing nut 16) and an operation arm component 5b that is capable of integrated motion extending from the operating cam component 5a whose protruding end side, as shown in FIG. 3, extends past the fixed component 2 and the waterproof cap 17 through hole, is located on the lateral exterior bicycle frame side of the fixed component 2, and is linked to the aforementioned wire coupler 6. The tensing operation force of the aforementioned inner wire 3a shuttles the switch position around the axis of the hub spindle 9 from the off position OFF to the on position ON, and the action of a return spring 19 attached to the aforementioned mounting boss component 2a between the aforementioned waterproof cap 17 and a decorative cap 18 and with one end connected to the aforementioned wire coupler 6 serves to return to the brake off position OFF. As indicated in FIG. 6, when the brake operation component 5 shuttles from the off position OFF to the on position ON, a plurality of "on" operating cam surfaces 5c with which the operating cam component 5a is provided come into contact with the plurality of rollers 12, pushing the rollers 12 from the roller case 13 towards the outside perimeter surfaces of the case so that the brake shoes 11 are pressed towards the brake drum 10. Thus, the brake operation component 6 operates so as to press each brake shoe 11 towards the side of the brake drum 10 and to push them against the inside perimeter surface 14a of the sliding member 14. At this time, the rotary force of the brake drum 10 is acted upon by the brake shoes 11 and the rollers 12.

As shown in FIGS. 3 and 4, a roller case fixing pin 20 extends from the roller case, passing through the fixed component 2 and waterproof cap 17 through holes and coming into contact with the fixed component 2 at the pin hole 2b end of the fixed component 2. Since the fixed component 2 supports the rollers 12 via the roller case fixing pin 20 and the roller case 13, and since a shoe pressing spring 21 that is wrapped around all of the brake shoes 11 pushes and forces the brake shoes 11 against the rollers 12, some of the rollers 12 enter convex sections located on the inside perimeter surface side of the brake shoes 11, engaging the brake shoes 11, with the result that a braking operation in which the brake shoes 11 and the rollers 12 are applied against the rotation of the brake drum 10 in a stroke defined by the roller case fixing pin 20 moving within the pin hole 2b in opposition to the return spring 22, without any additional movement. In this state, as illustrated in FIG. 5, when the brake operation component 5 is returned to the off position OFF, a plurality of "off" operating cam notches 5d with which the operating cam component 5a is provided align with the plurality of rollers 12 and, due to the force applied by the shoe pressing spring 21, the rollers 12 are pushed back in towards the roller case 13 so that the brake shoes 11 are allowed to come away from the sliding member 14, as a result of which operation the brake operation component 5 returns to the release pressure position with respect to the sliding member 14.

Figure 7:
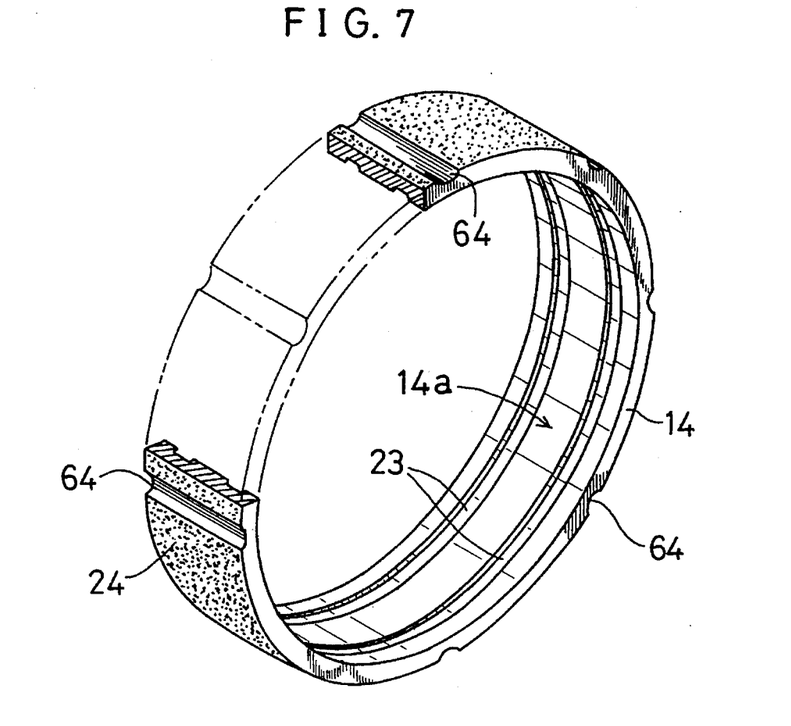
FIG. 7 is an oblique partial cutaway view of a particular embodiment of a sliding member employed in the bicycle hub brake shown in FIG. 1.

The aforementioned sliding member 14 is formed as a component separate from the brake shoes 11 and the brake drum 10, and is inserted slidably in the brake drum 10. The inside perimeter surface side of the sliding member 14, which faces the brake shoes 11, is provided with a grease groove 23 as shown in FIG. 7, brake grease is stored between the brake shoes 11 and the sliding member 14 in the aforementioned grease groove 23 so that the brake shoes 11 rub against the sliding member 14, with brake grease interposed, to effect braking action.

The brake shoes 11 are fabricated from a chromium-molybdenum steel material, the sliding member 14 is fabricated from carbon steel, and the brake drum 10 is fabricated from an aluminum alloy. The sliding member 14 is inserted into the brake drum 10 so that relatively high frictional force between it and the inside perimeter surface 10a of the brake drum 10 can be readily obtained, and the outside perimeter surface of the sliding member 14 that is in contact with the brake drum 10 is coated with a solid lubricant 24 to stabilize the coefficient of friction, examples of which are hard chrome plating and molybdenum disulfide coating. Thus, the relationship between the coefficient of friction between the brake shoes 11 and the sliding member 14 when brake grease is present, f1, the coefficient of friction between the brake shoes 11 and the sliding member 14 when the brake grease is depleted, f3, and the coefficient of friction between the sliding member 14 and the brake drum 10, f2, is set to conform to the equation:

coefficient of friction f1<coefficient of friction f2<coefficient of friction f3.

Thus, the relationship between the frictional force F1 generated between the brake shoes 11 and the sliding member 14 when brake grease is present and the brake shoes 11 and the sliding member 14 are in contact via a brake grease and the frictional force F2 generated between the sliding member 14 and the brake drum 10 is set to conform to the equation:

frictional force F1<frictional force F2.

When the brake grease is depleted and the brake shoes 11 and the sliding member 14 are in direct contact without intervening brake grease, the frictional force between the brake shoes 11 and the sliding member 14 changes from the aforementioned F1 to the stronger frictional force F3 due to the fact that the grease is depleted; the relationship between this frictional force F3 and the aforementioned frictional force F2 generated between the sliding member 14 and the brake drum 4 is set to conform to the equation:

frictional force F2<frictional force F3.

That is, the relationship of the magnitudes of the aforementioned frictional forces F1, F2, and F3 is set to:

frictional force F1<frictional force F2<frictional force F3.

In short, when the brake wire 3 inner wire 3a is released and the brake operation component 5 is operated to the off position OFF by the return spring 19, the brake operation component 5, due to the fact that the brake shoes 11 are released from sliding member 14 because the rollers 12 and the brake shoes 11 return towards the roller case 13 due to the operation force of the shoe pressing spring 21, releases the brakes.

When the brake wire 3 inner wire 3a is pulled and the brake operation component 5 is shuffled from the off position OFF towards the switch-on direction ON, the brake operation component 5 presses the brake shoes 11 against the sliding member 14 via the rollers 12 with the operating cam component 5a. At this time, if brake grease is present, the frictional force F1 between the brake shoes 11 and the sliding member 14 is lower then the frictional force F2 between the sliding member 14 and the brake drum 10, so the sliding member 14 rotates in conjunction with the brake drum 10 and the brake shoes 11 apply fictional braking force to the sliding member 14, as a result of which the brake shoes 11 exert a braking action on the brake drum 10 via the sliding member 14 so that the front wheel is braked. If the brake grease is depleted, the frictional force F3 between the brake shoes 11 and the sliding member 14 is greater then the frictional force F2 between the sliding member 14 and the brake drum 10, the brake shoes 11 hold by friction the sliding member 14 so that it does not rotate in conjunction with the brake drum 10, and the sliding member 14 applies frictional braking force to the brake drum 10 so that the front wheel is braked. Thus, even if the grease is depleted, the braking operation can be conducted without overbraking.

Figure 8:
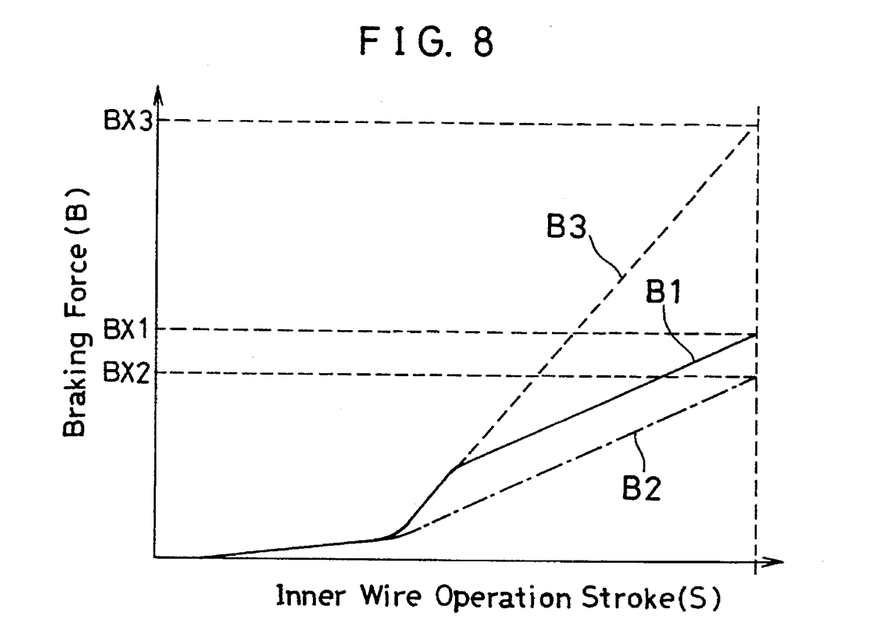
FIG. 8 is a graph showing brake force as a function of the brake wire operating stroke for the bicycle hub brake shown in FIG. 1.

That is, as illustrated in FIG. 8, regardless of whether brake grease is present or depleted, an increase in the inner wire 3a tensing operation stroke S is accompanied by a magnification, due to the sloped surfaces of the on cam 5c, of the operating force with the brake operation component 5 presses the brake shoes 11 against the sliding member 14 so that the braking force B applied to the front wheel increases. When brake grease is present, braking force B is generated by frictional force F1 between the brake shoes 11 and the sliding member 14 so the braking force B increases along braking force line B2, reaching a maximum at the maximum braking force BX2 afforded by tensing the inner wire 3a to the limit. When the brake grease has been depleted, braking force B is generated by frictional force F2 between the sliding member 14 and the brake drum 10 and this frictional force F2 is greater than the aforementioned frictional force F1, so the braking force B in this event increases along braking force line B1, reaching a maximum at the maximum braking force BX1 afforded by tensing the inner wire 3a to the limit. Since the aforementioned frictional force F2 is greater than F1, the aforementioned maximum braking force BX1 is greater than the aforementioned maximum braking force BX2. When the brake shoes 11 are made to perform direct braking action on the brake drum 10 in the absence of a sliding member 14 and the brake grease becomes depleted, the brake shoes 11 perform direct braking action on the brake drum 10 at the aforementioned frictional force F3, so an increase in the inner wire 3a tensing operation stroke S is accompanied by an increase in braking action B along braking force line B3, and when the inner wire 3a is pulled to the limit, the braking action B reaches the maximum braking force BX3. The maximum braking force BX3 at this time is a braking force greater than the maximum braking force BX1 due to the relationship of magnitude between the aforementioned frictional forces F3 and F2. Thus, when the grease is depleted, even if the inner wire 3a is pulled to the limit, only the maximum braking force BX1, lower than the aforementioned maximum braking force BX3, is produced, and this maximum braking force BX1 is, by virtue of setting the aforementioned frictional force F2, set at a braking force level that prevents overbraking. In actual practice, the aforementioned maximum braking force BX1 is set to afford a tire tangential force of approximately 45 kg, and maximum braking force BX2 to afford a tire tangential force of approximately 35 kg.

As shown in FIGS. 4 and 5, a warning device 60 is constructed from a sphere 61 inserted into an attachment hole in the brake drum 10, a sphere pressing spring 63 that is constructed so as to subject the sphere 61 to pressing force towards the outer perimeter surface of the brake drum 10 and that is attached to the outer perimeter surface of the brake drum 10 by an attachment screw 62, and a plurality of incised grooves 64, as shown in FIG. 7, that are formed on the outside perimeter surface side of the sliding member 14 at locations distributed along the circumference of the sliding member 14.

When the sliding member 14 and brake drum 10 the undergo integrated rotation, the sphere 61 does not undergo rotary motion with respect to the sliding member 14 and does not produce noise, and the warning device 60 is in non-operating mode. When the brake grease is depleted, slip is produced between the sliding member 14 and brake drum 10 and the sliding member 14 and brake drum 10 rotate in relation to each other, whereupon the brake drum 10 rotates with respect to the sliding member 14 while retaining the sphere 61 so that the sphere 61 moves along the outer perimeter side of the sliding member 14 in the circumferential direction, passing the incised grooves 64 in the sliding member 14. When the sphere 61 passes the incised grooves 64 in the sliding member 14, the pressing action of the sphere pressing spring 63 causes it to drop into the incised grooves 64 and collide with the sliding member 14 so that the collision of the sphere 61 with the sliding member 14 produces sound. By this process the warning device 60 is placed in operating mode, and the sound of the collision of the sphere 61 with the sliding member 14 indicates grease depletion.

In the aforementioned hub brake, the sliding member 14 and the brake shoes 11 are located inside the brake drum 10, so the overall brake is compact. This is advantageous in terms of the space required for installation and in terms of the ease of handling with which it can be installed on the bicycle frame. As an alternative to this hub-housed configuration, an external fitting configuration in which the brake shoe is of band form and the brake shoe and sliding member are installed on the outside of the brake drum can be adopted.

In the case of the aforementioned hub brake, the sliding member is of ring shape, as in the embodiment described above, so it can simply be inserted into the brake drum without the use of any special mounting components or pressing operation component and installed so as to press against the brake drum to produce the desired frictional force. Thus, from the standpoint of the sliding member mounting structure as well, the brake is afforded with the advantage of structural simplicity. As an alternative to this ring-shaped sliding member, a plurality of sliding members may be installed distributed along the circumference of the brake drum.

Figure 9:
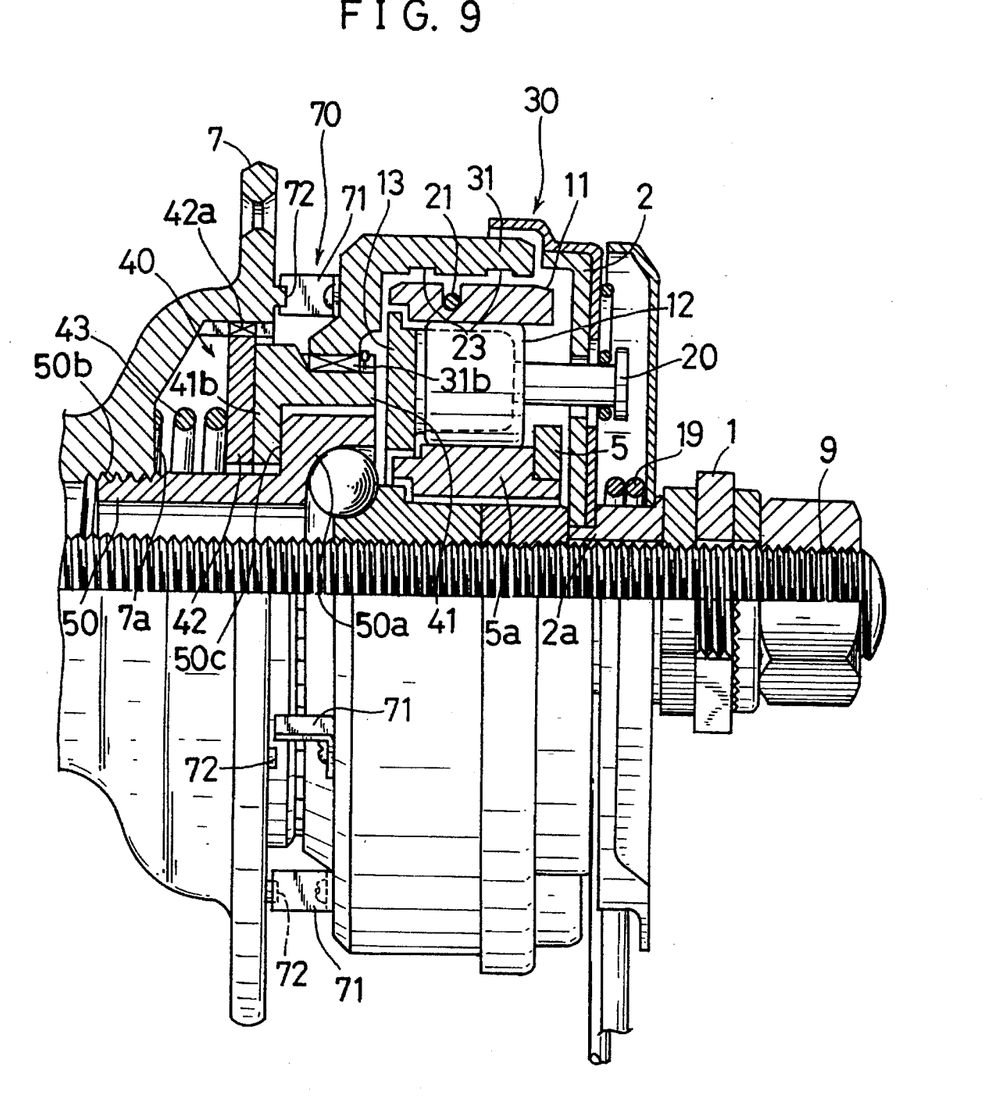
FIG. 9 is a rear partial cross-sectional view of an alternative embodiment of a bicycle hub brake according to the present invention.
Figure 10:
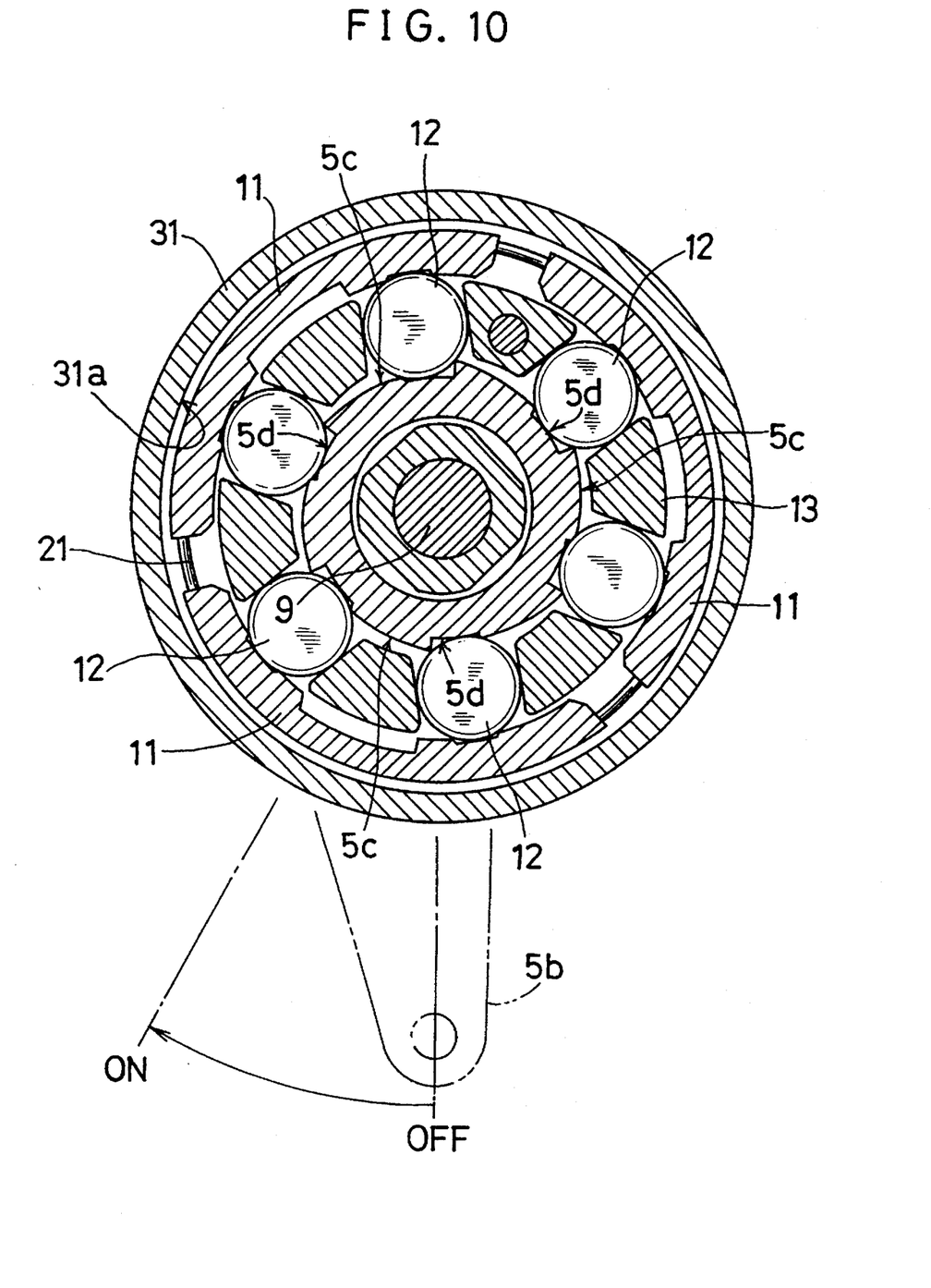
FIG. 10 is a side cross-sectional view of the bicycle hub brake shown in FIG. 9 in the OFF position.

FIGS. 9 and 10 show an alternative embodiment of a bicycle hub brake according to the present invention. In this embodiment, the bicycle hub brake comprises a brake chassis 30 furnished with a brake drum 31 constructed so as to be located at one end of the bicycle front wheel hub 7, and with brake shoes 11, rollers 12, a roller case 13, a brake operation component 5, and a fixed component 2 similar to those of the hub brake shown in FIGS. 2 through 5, and a torque limiter 40, located between the aforementioned brake drum 31 of the chassis 30 and the aforementioned front wheel hub 7 and constructed so as to link the brake drum 31 to the front wheel hub 7 in integrated rotating fashion.

When the brake wire 3 inner wire 3a is released and the brake operation component 5 is operated to the off position OFF by the return spring 19, a plurality of notches cut in the brake operation component 5 align with the plurality of rollers 12, and the shoe pressing spring 21 pushes the rollers 12 and the brake shoes 11 back towards the roller case 13. This results in the brake shoes 11 separating from the inside perimeter surface 31a of the brake drum 31 so that braking action of the brake drum 31 is released.

When the brake wire 3 inner wire 3a is pulled and the brake operation component 5 is shuttled around the axis of the hub spindle 9 from the off position OFF towards the on direction ON, the plurality of on operating cam surfaces align with the plurality of rollers 12, and the rollers 12 are pushed from the roller case 13 towards the outside perimeter surface side thereof so that the brake operation component 5 presses the brake shoes 11 against the inside perimeter surface 31a of the brake drum 31 via the rollers 12. By this process the brake shoes 11 rub against the brake drum 31 and exert a braking action.

The inside perimeter surface side (facing the brake shoes 11) of the brake drum 31 is provided with grease grooves 23, as shown in FIG. 9. Brake grease is stored between the brake drum 31 and the brake shoes 11 in the aforementioned grease grooves 23 so that the brake shoes 11 rub against the brake drum 31 and exert braking action in the presence of intervening brake grease. As shown in FIG. 9, a cylindrical member 50 has a surface which forms a ball receiver 50a and a stopper surface 50c opposite ball receiver 50a. Cylindrical member 50 is threaded into a connector section 50b of wheel hub 7. Disposed around cylindrical member 50 between stopper surface 50c and an edge surface 7a of hub 7 are a side portion of ring member 41, a friction plate 42, and a spring 43. Friction plate 42 is connected to hub 7 through a spline 42a so that friction plate 42 rotates as a unit with hub 7. The side portion of ring member 41, friction plate 42 and spring 43 together comprise torque limiter 40. That is, the ring member 41 fits so as to be capable of relative rotation with respect to the hub 7 and the cylindrical member 50, and is engaged with the brake drum 31 via a spline component 31b so as to be capable of relative motion with respect to the hub 7 and so as to rotate together with the brake drum 31. The friction plate 42 is engaged by a spline component 42a so as to be capable of integrated rotation and sliding with respect to the hub 7 and fits so as to be capable of relative rotation and sliding with respect to the cylindrical member 50, so that, with respect to the hub 7, it can slide in the direction of the hub axis only while rotating in integrated fashion with the hub 7.

With the hub 7 as the reaction force component, the spring 43 presses the friction plate 42 against the side surface 41b of the ring member 41, making it possible for the hub 7 rotational torque to be transmitted to the brake drum 31 by friction of the friction plate 42 and the ring member 41, and so that when the hub 7 rotational torque equals or exceeds the set torque value T determined by the coefficient of friction between the friction plate 42 and the ring member 41 and the pressing force of the spring 43, the friction plate 42 and the ring member 41 experience slip and undergo relative rotation. That is, when the rotational torque of the front wheel hub 7 is lower than the set torque value T, the torque limiter 40 is activated so that the brake drum 31 and the hub 7 are frictionally linked so as to rotate in integrated fashion. If the hub 7 rotational torque equals or exceeds the set torque value T, the torque limiter 40 is deactivated so that the brake drum 31 and the hub 7 rotate in relation to each other.

The torque limiter 40 is designed with a hub-housed configuration in which it is located inside one end of the hub 7. Thus, even with the attached torque limiter, the hub brake is compact and is easily attached to the bicycle frame in terms of the space required for attachment and in terms of ease of handling. This type of torque limiter can also be implemented by attaching the friction plate to the brake drum and attaching the ring member to the hub.

Figure 11:
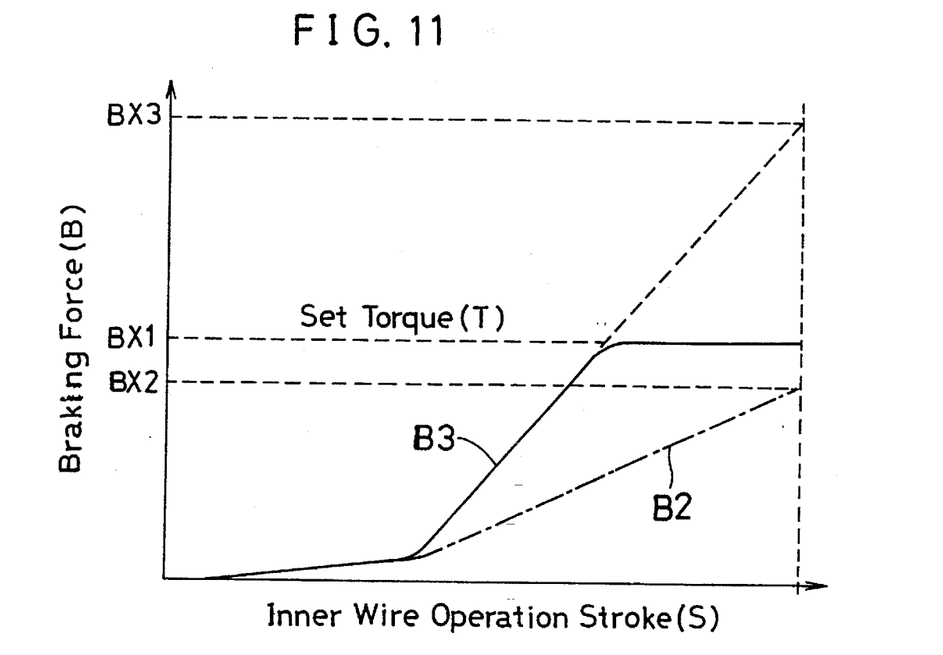
FIG. 11 is a graph showing brake force as a function of the brake wire operating stroke for the bicycle hub brake shown in FIG. 9.

The brake chassis 30 and the torque limiter 40 are constructed so that when brake grease is present and the brake shoes 11 contact the brake drum 31 with interposed brake grease, the brake chassis 30 yields the braking force curve B2 shown in FIG. 11 and so that when the brake grease is depleted and the brake shoes 11 contact the brake drum 31 without interposed brake grease, the relationship between the braking force curve B yielded by the brake chassis 30 and the aforementioned set torque T torque limiter 40 is as illustrated in FIG. 11.

That is, regardless of whether brake grease is present or not, an increase in the inner wire 3a tensing operation stroke S is accompanied by a magnification, due to the sloped surfaces of the on cam 5c, of the operating force with the brake operation component 5 presses the brake shoes 11 against the brake drum 31 so that the braking force B applied to the front wheel increases. When brake grease is present, braking force B is generated by frictional force F1 between the brake shoes 11 and brake drum 31 and braking force B is generated by this strong frictional force, so that the braking force at this time increases along braking force line B3. After it increases to braking force BX1 (determined by the aforementioned set torque T), subsequent further tensing of the inner wire 3a resulting in a further increase in the operating force with which the brake shoes 11 are pressed against the brake drum 31 produces no further increase as the torque limiter 40 is deactivated and the front wheel hub 7 slips with respect to the brake drum 31 so that the braking force actually applied to the front wheel does not exceed the aforementioned braking force BX1.

When, in the absence of a torque limiter 40, the brake grease has been depleted, an increase in the inner wire 3a tensing operation stroke is accompanied by an increase the braking action actually applied to the front wheel that exceeds the aforementioned braking force BX1, so when the inner wire 3a is pulled to the limit, the braking action actually applied to the front wheel reaches the maximum braking force BX3. However, since the torque limiter 40 is present, even if a braking operation in which the inner wire 3a is pulled to the limit is performed when the grease has been depleted, a maximum of braking force BX1, lower than the aforementioned maximum braking force BX3, is applied to the front wheel, so the brake operation can be performed without overbraking. In actual practice, the aforementioned maximum braking force BX1 is set to afford a tire tangential force of approximately 45 kg, and maximum braking force BX2 to afford a tire tangential force of approximately 35 kg.

As shown in FIG. 9, a warning device 70 is constructed from noise emitters 71 provided to the brake drum 31 at locations distributed along its circumference and a plurality of protrusions 72 provided to the hub 7 at locations distributed along its circumference. When the torque limiter 40 is not in activated mode, the brake drum 31 and the hub 7 rotate in tandem due to friction plate 42 and ring member 41 friction so that the hub 7 does not undergo rotary motion with respect to the noise emitters 71. Thus, the warning device 70 is in non-operating mode. When the torque limiter 40 is in activated mode, slip is produced between the friction plate 42 and the ring member 41, and the brake drum 31 and the hub 7 rotate in relation to each other so that the hub 7 undergoes rotary motion with respect to the noise emitters 71. At this point, each time the protrusions 72 pass the noise emitters 71 the noise emitters 71 are bent by the protrusions 72 and vibrate so as to emit noise. The noise emitted by the noise emitters 71 serves to warn that the grease is depleted.

Figure 12:
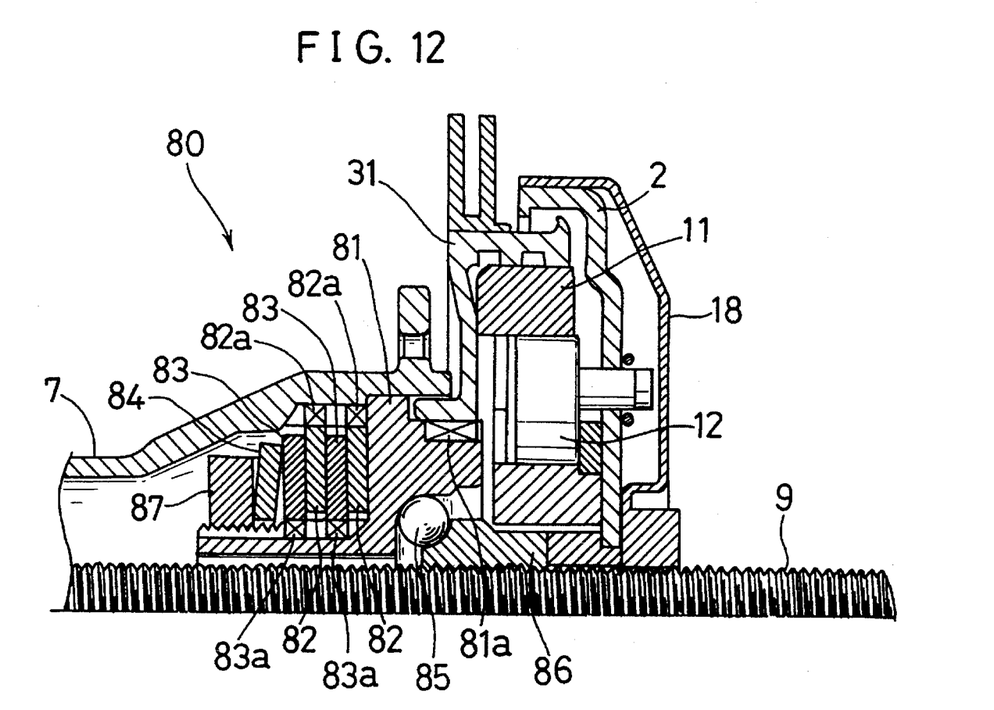
FIG. 12 is a rear partial cross-sectional view of another alternative embodiment of a bicycle hub brake according to the present invention.

FIG. 12 shows another alternative embodiment of a bicycle hub brake according to the present invention which employs a torque limiter 80. Torque limiter 80 comprises a ring component 81 housed in one end of the hub 7, two hub-side friction plates 82, two brake-side friction plates 83, and a disc spring 84 located further towards the inside of the hub 7 than the friction plate pairs 82 and 83.

The ring component 81 is designed to be rotatably supported by the hub spindle 9 via a ball 85 and a cone 86, fits in relatively rotating fashion inside one end of the hub 1, and is linked in integrated rotating fashion to the brake drum 31 by a spline member 81a. The hub-side friction plates 82 are linked so as to be rotated in integrated fashion with respect to the hub 7 by a spline member 82a and so as to slide in the hub axis direction. The brake-side friction plates 83 are linked so as to be rotated in integrated fashion with respect to the ring component 81 by a spline member 83a and so as to slide in the hub axis direction. The spring 84, using a spring bracket 87 screwed onto the end of the ring component 81 as the reaction force component, exerts pressing force directly or indirectly on the hub-side friction plates 82 and the brake-side friction plates 83 against the side surface 81a of the ring component 81 so that the hub-side friction plates 82 and the brake-side friction plates 83 are pressed and friction is produced between the friction plate pairs 82 and 83.

The aforementioned set torque T is determined by the strength of the frictional force of the friction plates 82 and 83. When rotation torque of the front wheel hub 7 is lower than the set torque T, the hub 7 and the ring component 81 rotate in integrated fashion due to the friction of the friction plates 82 and 83. The torque limiter 80 is thereby placed in nonoperational mode and the brake drum 31 and the hub move in integrated fashion. When rotation torque of the front wheel hub 7 is equal to or greater than the set torque T, the friction plates 82 and 83 experience slip so that the hub 7 and the ring component 81 undergo relative rotation. The torque limiter 80 is thereby placed in operational mode and the brake drum 31 and the hub 7 undergo relative rotation In addition to the frictional type adopted in the foregoing embodiment, the torque limiter can also be implemented using a positive-type clutch and a spring that biases the clutch towards the on position and sets the torque when the clutch is switched off. In addition to a hub-housed configuration located inside the hub, a hub-exterior type located on the outside of the hub can also be adopted.

While the above is a complete description of a preferred embodiment of the present invention, including various modifications, still further modifications may be employed. For example, the warning device 60 or 70 can be omitted. The present invention can be implemented for hub brakes that are supplied with brake grease during use, as well as for hub brakes that are designed to be used without brake grease. The present invention can be implemented for brakes in which the brake shoes are pressed against the side of the brake drum by rollers, as in the foregoing embodiments, as well as for internal expanding brakes designed so that a plurality of brake shoes are pressed against or released from the inside of the brake drum by a rotating cam.

The hub brake can be designed such that, under normal conditions, the frictional force between the sliding member and the brake shoes is greater than the frictional force between the sliding member and the brake drum. Furthermore, a means could be designed so that the coefficient of friction between the sliding member and the brake shoes and the coefficient of friction between the sliding member and the brake drum are the same, while the force of frictional contact of the brake shoes with the sliding member and the force of frictional contact of the sliding member with the brake drum are different. The effective result would be essentially the same.

Consequently, the scope of the present invention should be determined by the following claims.

What is claimed is:

1. A bicycle brake apparatus comprising:

a rotating member for rotating with a bicycle wheel;

a brake actuating mechanism for causing a brake member to apply a braking force to a braking surface; and an intermediate member disposed between the brake actuating mechanism and the rotating member for moving relative to one of the brake actuating mechanism and the rotating member when a braking force less than a selected value is applied to the braking surface and for moving relative to the other one of the brake actuating mechanism and rotating member when a braking force greater than the selected value is applied to the braking surface.

2. The apparatus according to claim 1 wherein the intermediate member is disposed between the brake member and the rotating member.

3. The apparatus according to claim 2 wherein the rotating member comprises a wheel hub, wherein the intermediate member comprises a brake drum having an inner peripheral surface comprising the braking surface, and further comprising a torque limiter disposed between the brake drum and the hub so that the brake drum rotates relative to the hub when a braking force greater than the selected value is applied to the braking surface.

4. The apparatus according to claim 3 wherein the torque limiter comprises a first friction member coupled to one of the brake drum and the hub and a second friction member coupled to the other one of the brake drum and the hub, wherein the first friction member has a first friction surface which frictionally engages a second friction surface of the second friction member.

5. The apparatus according to claim 4 wherein the torque limiter further comprises a spring for biasing the first friction surface and the second fiction surface toward each other.

6. The apparatus according to claim 5 wherein the first and second friction members are adapted to move along an axis of rotation of the hub.

7. The apparatus according to claim 2 wherein the intermediate member includes a surface which frictionally engages a surface of the rotating member, and wherein the brake member includes a surface which frictionally engages the braking surface.

8. The apparatus according to claim 7 wherein a coefficient of friction between the surface of the intermediate member and the surface of the rotating member is ordinarily greater than a coefficient of friction between the surface of the brake member and the braking surface.

9. The apparatus according to claim 8 further comprising a lubricant disposed between the brake member and the intermediate member such that, if the lubricant is depleted, a coefficient of friction between the surface of the brake member and the braking surface is greater than a coefficient of friction between the surface of the intermediate member and the surface of the rotating member.

10. The apparatus according to claim 7 wherein the intermediate member comprises a ring disposed radially within the brake drum, and wherein the brake member is disposed radially within the ring.

11. The apparatus according to claim 2 wherein the rotating member comprises a brake drum which rotates integrally with a wheel hub, wherein the intermediate member comprises a ring disposed radially within the brake drum, and further comprising a plurality of the brake members disposed radially within the ring.

12. The apparatus according to claim 11 wherein the brake actuating mechanism comprises:

a plurality of rollers disposed radially inwardly of the plurality of brake members; and a cam for urging the plurality of rollers radially outwardly in response to rotation of the cam so that the plurality of brake members frictionally engage an inner peripheral surface of the intermediate member.

13. The apparatus according to claim 1 wherein the intermediate member moves relative to the brake actuating mechanism when a braking force less than the selected value is applied to the braking surface, and wherein the intermediate member moves relative to the rotating member when a braking force greater than the selected value is applied to the braking surface.

14. The apparatus according to claim 13 wherein the intermediate member rotates integrally with the rotating member when a braking force less than the selected value is applied to the braking surface, and wherein the intermediate member moves relative to the rotating member and is substantially fixed to the brake member when a braking force greater than the selected value is applied to the braking surface.

15. The apparatus according to claim 14 further comprising a warning device coupled to one of the rotating member and the intermediate member for providing a signal indicating when the rotating member moves relative to the intermediate member.

\* \* \* \* \*